(12) United States Patent
Horn et al.

(10) Patent No.: US 7,141,204 B2
(45) Date of Patent: Nov. 28, 2006

(54) METHOD OF FORMING CERAMIC ARTICLES

(75) Inventors: Keith A. Horn, Corning, NY (US); Jun Hou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 632 days.

(21) Appl. No.: 10/322,175

(22) Filed: Dec. 18, 2002

(65) Prior Publication Data

US 2004/0119209 A1  Jun. 24, 2004

(51) Int. Cl.
*C04B 35/622* (2006.01)
*B01D 53/00* (2006.01)

(52) U.S. Cl. .................. 264/657; 264/630; 264/669

(58) Field of Classification Search ........... 264/109, 264/177.11, 177.12, 630, 631, 669, 670, 656, 264/657; 419/30, 36
See application file for complete search history.

(56) References Cited

U.S. PATENT DOCUMENTS

| 3,755,204 A | 8/1973 | Sergeys |
| 3,854,186 A | 12/1974 | Sergeys |
| 3,904,551 A | 9/1975 | Lundsager et al. |
| 3,911,070 A | 10/1975 | Lundsager |
| 3,926,851 A | 12/1975 | Sergeys |
| 5,759,425 A | 6/1998 | Miyazaki et al. |
| 6,080,345 A | 6/2000 | Chalasani et al. |
| 6,087,281 A * | 7/2000 | Merkel ................... 501/9 |
| 6,299,678 B1 | 10/2001 | Beall et al. |
| 2004/0079469 A1* | 4/2004 | Chan et al. ........... 156/89.11 |

FOREIGN PATENT DOCUMENTS

EP    753490 B1 *  1/2002

* cited by examiner

*Primary Examiner*—Carlos Lopez
(74) *Attorney, Agent, or Firm*—Randall S. Wayland; Anca C. Gheorghiu

(57) ABSTRACT

An improvement in a method of forming ceramic articles comprising an oil component or extrusion aid, the improvement including removing a substantial portion of the oil component, prior to firing, by applying a solvent to the green ceramic article to dissolve the oil component.

16 Claims, 2 Drawing Sheets

METHOD OF FORMING CERAMIC ARTICLES

BACKGROUND OF INVENTION

The present invention relates to an improvement in forming ceramic cellular articles, such as honeycombs, from an extrudable or moldable powder batch composition comprising an inorganic powder component consisting of a mixture of sinterable inorganic particulate materials, e.g., ceramic powder materials, and a binder system including oil-based compounds which are flammable during subsequent debinding. In particular the improvement comprises extracting the oil-based components from green structures with a solvent prior to firing.

Popular ceramic multicellular ceramic bodies which are generally formed by extrusion, such as those finding applications in catalytic converters, diesel particulate filters, electrically heated catalysts, and chemical processing, require binders and extrusion aids for proper processing. Typically, water-soluble cellulose ether binders are used; however, such binders alone are not suitable for the manufacture of extremely thin-walled, high cell density cellular structures, and webs of 4 mils or less. U.S. Pat. Nos. 6,080,345 and 6,368,992 disclose the use of oil-based compounds, such as polyalpha olefin, in combination with cellulose ether binders for improved processing of such structures. The use of oil-based components improves extrudability and wet strength of the green structures. For ease of description oil-based compounds shall be referred to as oil or oils hereinafter.

While advantageous for extrusion, oils can lead to significant problems during firing. Specifically, such components cause a strong exotherm, which unless controlled effectively, can lead to uncontrolled combustion or detonation in the kiln. Significant amounts of small volatile combustibles are released during firing resulting in pressure build-up inside the kiln. In an inert atmosphere, and at temperatures above their boiling points, the oils evaporate quickly leading to sudden local heat losses, thermal stresses, and ultimately cracks in the ware.

Specially designed kilns, apparati for volatile removal, and elaborate firing cycles have been employed to control the burnout of oils, and reduce combustible concentrations in the kiln atmosphere. Closed kilns must be effectively managed so as not to cause safety issues. The reduced kiln throughput and significant costs associated with safe operation are operating issues of significance.

Removal of oils from structures, including ceramic bodies, is known in the prior art. Co-pending U.S. Pat. App. having Ser. No. 60/422,191, entitled "Process for removing oil-based components and forming ceramic bodies", by Chan et al., discloses a method of forming cellular ceramic bodies which includes removing oils from green bodies, after drying and prior to firing, by flowing a heated gas through the green body to evaporate the oils.

U.S. Pat. No. 3,904,551 issued to Lundsager et al. is directed to a method of preparing an auto exhaust catalyst converter from a mixture of ceramic powders, a polyolefin binder component and a plasticizer component. Therefore, this reference specifically teaches the use of non-aqueous thermoplastic binder systems. Prior to firing, the plasticizer component, e.g., mineral oil, is removed by a solvent, e.g., hexane, to form porosity and a microporous structure. Structures of cordierite are disclosed. However, cordierite bodies made from a mixture of inorganic powders and a water-soluble binder system, which may additionally contain a surfactant or other processing aids, are not recognized. In addition the advantages of using oils to improve extrudability and wet strength are not taught. Further, removal of oil-based components by selective dissolution thereof without dissolving the organic water-soluble binders is not taught. Moreover, the effect of removing oils on green strength, and key fired chemical, physical, as well as mechanical properties is also not recognized.

Similarly, U.S. Pat. Nos. 3,755,204, 3,854,186, 3,926,851, and 3,911,070 disclose the removal of oils from ceramic structures, including cordierite, by using a solvent. Again, the ceramic cordierite bodies do not include a combination of a water-soluble binder, and oil-based components, and there is no recognition of the benefits of improved extrudability and wet strength by using such water-soluble binder and oil combinations. Further, there is no discussion on selective removal of the oil-based component, while keeping the water-soluble binder intact, and maintaining high green strength as well as key fired chemical, physical and mechanical properties.

SUMMARY OF INVENTION

In accordance with the present invention oils are removed from green ceramic bodies prior to firing to significantly diminish, if not eliminate, the release of volatile combustibles, while at the same time maintaining dimensional tolerances and high green strength for multicellular structures. As such the invention comprises an improvement in forming ceramic bodies, particularly, ceramic cellular structures, comprising oils, the improvement including extracting the oils from green structures, by removing (e.g., dissolving) the oils with a solvent prior to firing.

Accordingly the practice of the invention comprises forming a mixture of components including inorganic ceramic powder materials, water, a water-soluble binder, a surfactant, and an oil; mixing and plasticizing the components to form a plasticized mixture; shaping the plasticized mixture into a green ceramic article; removing a substantial portion of the oil component through extraction with a solvent capable of dissolving the oil, but not the water-soluble binder; and, firing the green ceramic to develop the ceramic product structure.

The present invention is applicable to the fabrication of complicated ceramic bodies, that are usually formed by extrusion, and to the manufacture of the corresponding fired bodies such as multicellular ceramic honeycomb structures having a high cell density and exhibiting thin cell wall dimensions.

DETAILED DESCRIPTION OF INVENTION

In accordance to the practice of the invention there is provided an improvement in forming ceramic articles, and specifically, honeycomb ceramic structures used in a number of applications such as catalytic converters, NOx adsorbers, electrically heated catalysts, filters such as diesel particulate filters, molten metal filters, regenerator cores, chemical process substrates or catalysts for hydrodesulfurization, hydrocracking, hydrotreating, etc.

Figure 1:
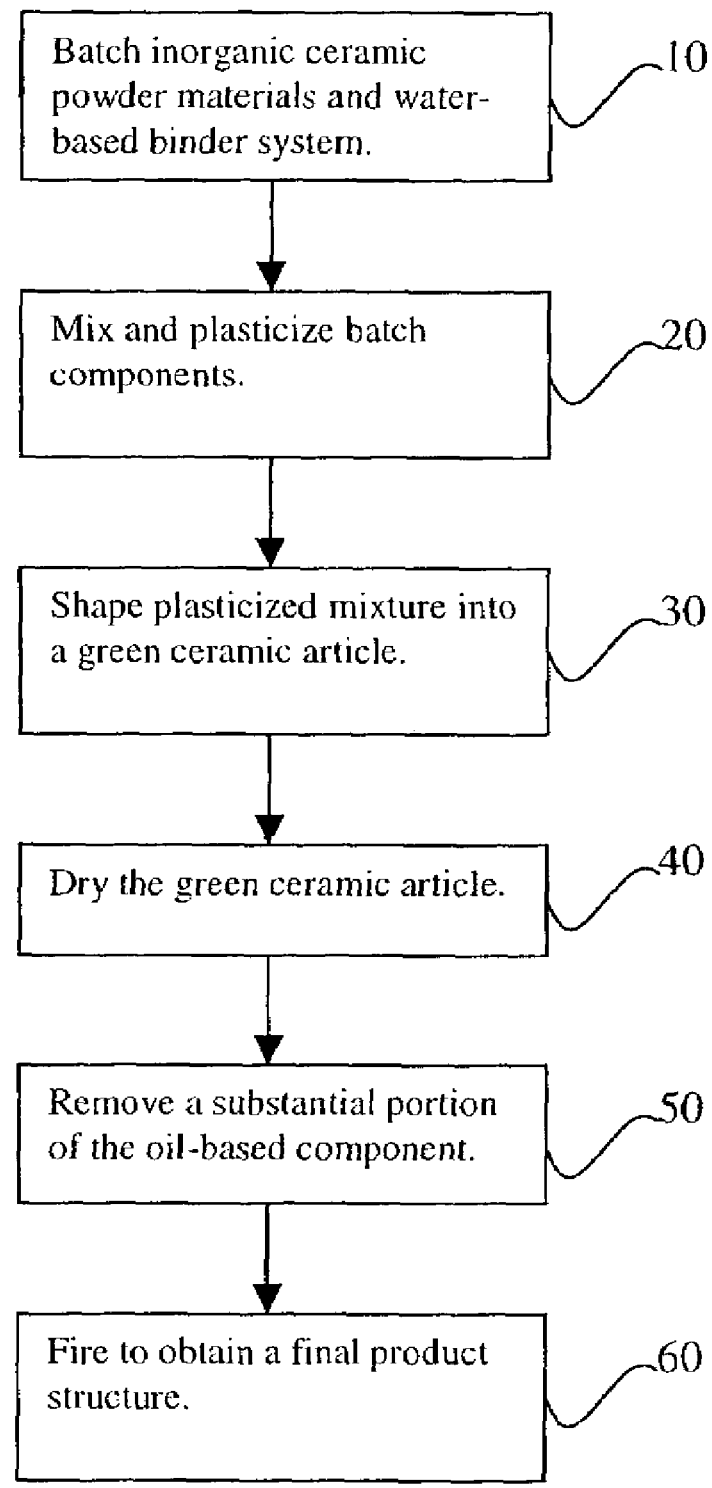
FIG. 1 is a flow chart depicting the steps of a process of forming cellular ceramic articles according to the present invention.

There is shown in FIG. 1 a flow chart depicting the steps of the method of this invention. In step 10 a batch is formed comprising inorganic ceramic powder materials and an aqueous binder system. For purposes of the present invention, suitable powder inorganic materials form highly filled mixtures meaning they have a high solid to liquid content in the mixture. For example, the powder material content in the mixture of the present invention is typically at least about 45% by volume, and most typically at least about 55% by volume. Typical powders are inorganics such as ceramic, glass ceramic, glass, molecular sieve, metal, or combinations of these.

By ceramic, glass ceramic and glass ceramic powders is meant those materials as well as their pre-fired precursors. By combinations is meant physical or chemical combinations, e.g., mixtures or composites. Examples of these powder materials are cordierite, mullite, clay, talc, zircon, zirconia, spinel, aluminas and their precursors, silicas and their precursors, silicates, aluminates, lithium aluminosilicates, alumina silica, feldspar, titania, fused silica, nitrides, carbides, borides, e.g., silicon carbide, silicon nitride, soda lime, aluminosilicate, borosilicate, sodium barium borosilicate or mixtures of these, as well as others.

The invention is especially suitable for use with cordierite and/or mullite-forming raw material powders. Examples of such mixtures include 2% to 60% mullite, and 30% to 97% cordierite, with allowance for other phases, typically up to 10% by weight. Some ceramic batch material compositions for forming cordierite that are especially suited to the practice of the present invention are those disclosed in U.S. Pat. No. 3,885,977 which is herein incorporated by reference as filed.

The powdered raw materials can be synthetically produced such as oxides, hydroxides, etc., or they can be naturally occurring minerals such as clays, talcs, or any combination of these. The invention is not limited to the types of raw materials. These can be chosen depending on the properties desired in the body.

One composition which ultimately forms cordierite upon firing is as follows in percent by weight, although it is to be understood that the invention is not limited to such: 33% to 41%, and preferably 34% to 40% of an alumina-forming source, 46% to 53%, and preferably 48% to 52% of a silica-forming source, and 11% to 17%, and preferably 12% to 16% of magnesium oxide. The alumina-forming source includes, but is not limited to, alpha-alumina, gamma-alumina, rho-alumina, boehmite, aluminum hydroxide, and their mixtures. The silica-forming source includes, but is not limited to, quartz, cristobalite, non-crystalline silica, such as fused silica or sol-gel silica, zeolite, diatomaceous silica, and combinations thereof. Clay, including calcined kaolin and kaolin clay, is generally suitable as the source for silicon and aluminum oxides.

In addition to the inorganic raw materials, the mixture further includes a binder system composed of water, a water-based binder, an oil, and a surfactant. The weight percents of the various components are calculated by the following formula: [weight of component/total weight of inorganic powders in the batch]×100.

The binder component is water soluble, and acts to bind the inorganic powders while at the same time imparting plasticity to the batch when mixed with water. Although not limited to this class of water-soluble binders, the binder of this invention is preferably a compound in the class of cellulose ether binders. Some typical cellulose ether binders according to the present invention are methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, and mixtures thereof. Methylcellulose and/or methylcellulose derivatives are especially suited as organic binders in the practice of the present invention with methylcellulose, hydroxypropyl methylcellulose, or combinations of these being preferred. Especially preferred cellulose ethers are hydroxypropyl methylcellulose, hydroxyethylcellulose, hydroxyethyl methylcellulose, a combination of hydroxyethyl or hydroxypropyl with methyl, ethyl, propyl, and butyl cellulose.

The oil functions as an extrusion aid, and is chosen from both synthetic and natural substances, as disclosed in U.S. Pat. Nos. 6,080,345 and 6,299,678, both of which are herein incorporated by reference in their entirety. Suitable oils include but are not limited to paraffins, olefins, aromatics, with $C_{17}$ to $C_{35}$ paraffins, and/or $C_{20}$ to $C_{30}$ hydrogenated polyalpha olefins. Preferred oils include polyalpha olefins, $C_{14}$–$C_{24}$ light mineral oil, and corn oil.

Some surfactants that can be used in the practice of the present invention are $C_8$ to $C_{22}$ fatty acids and/or their derivatives, including salts of such acids. Additional surfactant components that can be used with these fatty acids are $C_8$ to $C_{22}$ fatty esters, $C_8$ to $C_{22}$ fatty alcohols, and combinations of these. Low molecular weight poly(meth)acrylic actids (molecular weight<3000) and their salts can also be used. Preferred surfactants are stearic, lauric, oleic, linoleic, palmitoleic acids, and their derivatives, stearic acid in combination with ammonium lauryl sulfate, and combinations of all of these. Most preferred surfactants are lauric acid, stearic acid, oleic acid, and combinations of these.

In a preferred embodiment, the composition comprises, in percent by weight, based on 100% of inorganic powder, about 2 to 50% oil, about 0.2 to 10% surfactant, about 2 to 10% methyl cellulose binder, and about 6 to 50% water.

In a more preferred embodiment, the composition comprises, in percent by weight, based on 100% of inorganic powder, about 5 to 10% oil, about 0.2 to 2% surfactant, about 2 to 8% methyl cellulose binder, and about 8 to 35% water.

The batch components are mixed in step 20, preferably in two stages. In the first stage, or wetting stage, of batch formation, the inorganic powdered raw materials are mixed with the water-based binder and surfactant, and then the water is added in an amount to wet the batch. Optionally, prior to the addition of water, the dry mixture is processed through a powderizer apparatus, such as NSP-Powderizer Model No. 2 available from Sturtevant Inc, Hanover, Mass. The oil is then added to the wetted mixture.

The plasticization of the mixture takes place in the second stage. In this stage the wet mix from the first stage is sheared in any suitable mixer in which the batch is plasticized, such as for example in a twin-screw extruder/mixer, auger mixer, muller mixer, or double arm mixer, etc. During plasticization, the binder dissolves in the water and a gel is formed. The surfactant enables the deagglomeration of the inorganic particles and promotes adhesion of the binder to the inorganic particles. The oil serves as a lubricant to reduce the friction between the inorganic particles in the batch and the walls of the vessel containing it, e.g., mixer, or extruder, or die wall.

In step 30 the resulting stiff batch is shaped into a green body by any known method for shaping plasticized mixtures, such as extrusion, injection molding, slip casting, centrifugal casting, pressure casting, dry pressing, etc. The mixture is best suited for extrusion through a die. The extrusion operation can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die. The extrusion can be vertical or horizontal.

The bodies of this invention can have any convenient size and shape. Preferably, the ceramic body comprises a honeycomb monolith multicellular structure having a plurality of parallel cell channels traversing the body between two end faces, known as the inlet and outlet ends. Generally honeycomb densities range from about 62 cells/cm$^2$ (about 400 cells/in$^2$) to about 140 cells/cm$^2$ (about 900 cells/in$^2$), although others may be equally applicable. Wall thickness is less than about 0.1 mm (4 mils), preferably about 0.02–0.1 mm (1–4 mils). Such honeycomb articles find application as automotive catalytic converters and diesel particulate filters. For diesel particulate filters the honeycomb comprises a plurality of parallel end-plugged cell channels traversing the body form the frontal inlet end to the outlet end thereof, as known in the art.

While drying of the green ceramic structures, and removal of at least a substantial portion of the oil may be performed concurrently or in any suitable sequence, oil extraction preferably is effected after drying. Therefore, in the embodiment of FIG. 1, in step 40 the wet green ceramic structures are dried according to known techniques. Suitable drying methods for the present invention are disclosed in U.S. Pat. Nos. 5,263,263, 5,406,058, 6,344,342, and 6,259,078 assigned to the present assignor and herein incorporated by reference in their entirety.

Figure 2:
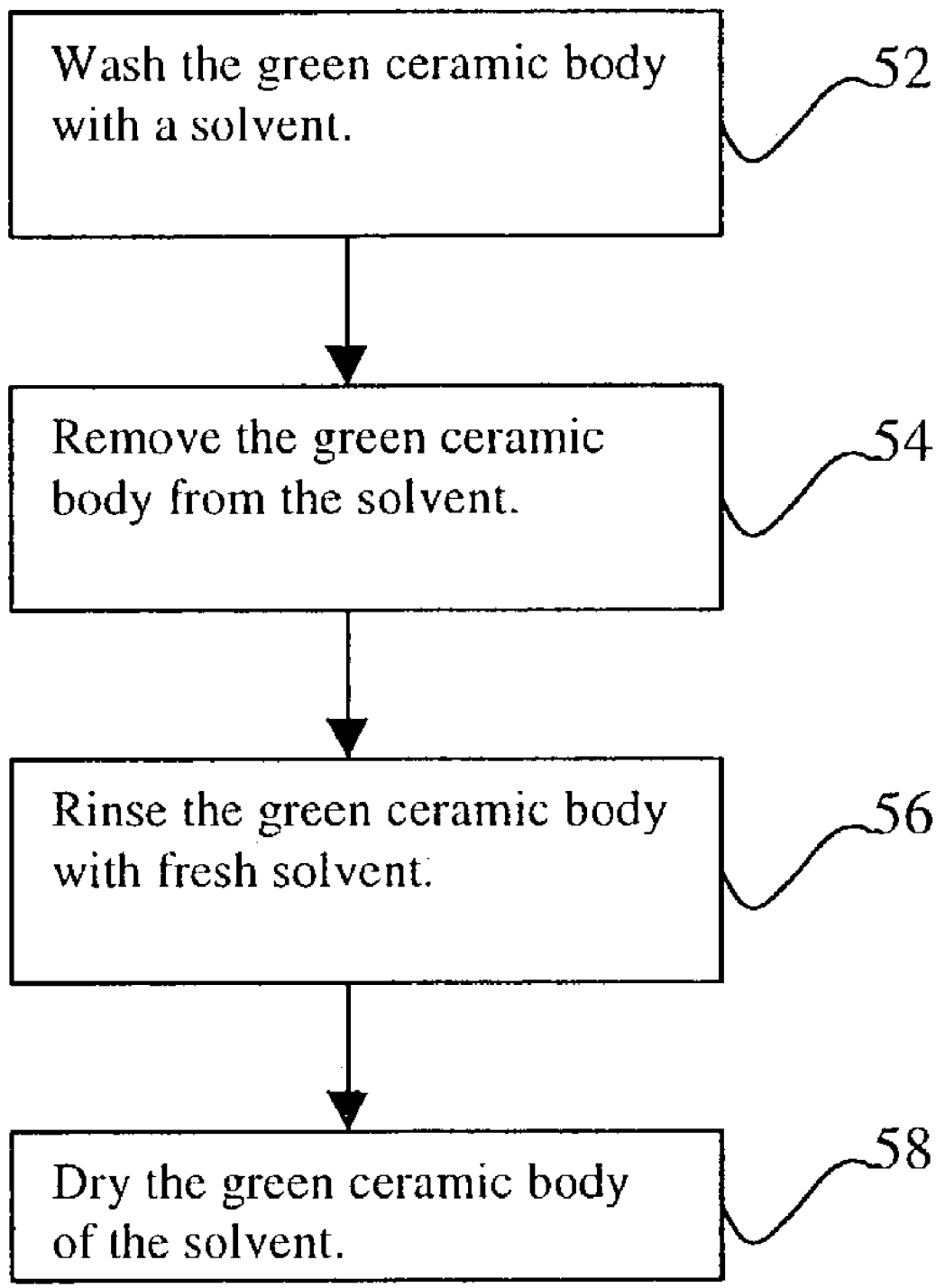
FIG. 2 is a flow chart depicting the steps of oil extraction according to the process of the present invention.

Thereafter, in step 50 a substantial portion of the oil is extracted so as to avoid uncontrolled burning and hazardous conditions during the subsequent de-binding. Referring now to FIG. 2 therein illustrated are the steps comprising the extraction process of 50. Oil removal is attained by an extraction process in which the green ceramic body is washed and rinsed by contacting it with either a vapor or liquid solvent. The extraction process is completed by drying the solvent-treated ceramic body.

Accordingly step 52 comprises washing the green ceramic body with a solvent, in either a vapor or liquid form, for a period of time sufficient to dissolve a substantial portion of the oil. How the green ceramic body is brought into contact with the solvent is not important to the practice of the present invention. Suitable methods include liquid immersion and solvent vapor treatment as known to those skilled in the art. The contact period of time suitable for the present invention will depend on the composition and shape of the ceramic body, as well as the solvent employed.

The solvent is selected to dissolve the oil, but not the water-soluble binder. For purposes of the present invention, suitable solvents include hydrocarbons, such as pentane, cyclopentane, hexane, cyclohexane, heptane, petroleum ether, and octane; chlorohydrocarbons (e.g., perchloroethylene or PERC, and trichloroethylene or TCE, available from Dow Chemical, Midland, Mich.), bromohydrocarbons (e.g., n-propyl bromide or NPB, available from Poly System USA Inc.), hydrofluoroether (HFE)-dichloroethylene blends (e.g., HEF-71DE, HFE-72DE, and HFE-71D90 available from 3M, Minneapolis, Minn.), hydrochlorofluorocarbons or HCFCs (e.g., AK-225 available from Tech Spray Inc., Amarillo, Tex.), and combinations thereof. Preferred solvents include NPB, PERC and cyclohexane.

Next, the ceramic body is removed from the solvent in step 54. The solvent containing oil is drained. Optionally, in step 56 the washed green ceramic body is rinsed using a fresh solvent to achieve a more complete removal of the oil. Following washing and rinsing, step 58 comprises drying the solvent-treated green ceramic body to remove remaining solvent. Such drying is achieved by methods known in the art of parts cleaning or degreasing. Specifically, suitable drying methods include-super-heated vapor drying, centrifugal drying, vacuum drying, and air knives.

In a preferred embodiment, the solvent-extraction step is achieved in a fully enclosed commercial system, such as a vapor degreasing apparatus available from Forward Technology, Minneapolis, Minn. or Pero Corporation, Windsor, Conn. Such systems operate to include solvent washing, rinsing, and drying along with solvent recycling via distillation, in a closed system which can be easily incorporated into preexisting production lines. The extraction of the oil may be accomplished in a batch, a semi-continuous, or an in-line continuous process. The removed oil may be discarded, or reused with proper treatments in new batches.

Referring back to FIG. 1, following the removal of oil, the ceramic bodies, still being green, are fired in step 60 at a selected temperature under suitable atmosphere and for a time dependent upon the composition, size and geometry. The invention is not limited to specific firing temperatures and times. For example, in compositions that are primarily for forming cordierite, the temperatures are typically from about 1300° C. to about 1450° C., and the holding times at these temperatures are from about 1 hour to about 8 hours. For mixtures that are primarily for forming mullite, the temperatures are from about 1400° C. to about 1600° C., and the holding times at these temperatures are from about I hour to about 6 hours. For cordierite-mullite forming mixtures which yield the previously described cordierite-mullite compositions, the temperatures are from about 1375° C. to about 1425° C. Firing times depend on factors such as kinds and amounts of materials and nature of equipment but typical total firing times are from about 20 hours to about 80 hours.

To more fully illustrate the invention, the following non-limiting examples are presented. All parts, portions, and percentages are on a weight basis unless otherwise stated.

EXAMPLES

Inorganic powder batch mixtures, as listed in percent by weight, suitable for the formation of a ceramic body having cordierite as its primary crystalline phase are listed in Table I. Batch mixtures were prepared by weighing out the dry ingredients, mixing them with water and organics and kneading the mixture in a stainless steel muller to form a plastic mixture. The mixture was extruded into cellular honeycomb bodies consisting of multiple parallel channels of square cross section.

Composition A was extruded into honeycombs having a cell density of 400 cells per square inch, a cell wall thickness of about 0.004 inches, a diameter of 12 inches and a length of 7.5 inches (hereinafter referred to as 400/4). The 400/4 honeycombs are suitable as diesel particulate filters (refer to U.S. Pat. No. 5,258,150 herein incorporated by reference in its entirety).

Composition B was extruded into honeycombs having a cell density of 900 cells per square inch, a cell wall thickness of about 0.002–0.003 inches, a diameter of 4.3 inches and a length of 5.2 inches (hereinafter referred to as 900/2). The 900/2 honeycombs are suitable as substrates for automotive catalytic converter applications (refer to U.S. Pat. No. 6,214,437 herein incorporated by reference in its entirety).

After drying, a portion of the 400/4 and 900/2 honeycombs were treated to extract a substantial portion of the oil, either manually in the laboratory according to the processing steps provided above, or in a commercially available vapor degreasing apparatus. For each honeycomb treated, the percentage of the extracted oil component is noted in Tables II and III. The remaining parts comprising oil are referred to as the "Control". All parts were then fired at a rate of between 15 and 100° C./hour to a maximum temperature of 1405° to 1430° C. and held for 6 to 25 hours.

The parts were tested for crystalline phases, strength, porosity, median pore size, and bulk density. For the phase analysis, the weight percentages of cordierite, mullite, alumina, and spinel in the fired body were measured by powder x-ray diffractometry using internal standards. Percent porosity and median pore size were determined by mercury porosimetry. The strength testing comprised modulus of rupture (MOR) along with A-axis, B-axis, and C-axis crush strength. A-axis strength is measured by applying a downward force to a slice of the honeycomb. The B-axis strength is measured by applying a force parallel to the cell walls. The C-axis strength is measured by applying a force in a direction along the diagonal of a cell.

The results of the physical properties are summarized in Table II for Composition A parts, and Table III for Composition B parts. In comparing the inventive and control parts, all the properties of the inventive parts were maintained at the same or better levels, with, however, the added benefit that more than 90% of the oil was removed in the inventive parts. The removal of a substantial portion of the oil allows for a safer de-binding and firing process.

Accordingly, there are numerous benefits associated with the present method of manufacturing ceramic multicellular ceramics. By removing the oil prior to firing, the green ceramic bodies can be fired faster and more safely. Therefore, the stringent requirements of controlling the kiln atmosphere during firing of green ceramic bodies containing oils is eased in the instant invention allowing firing in conventional kilns and reducing manufacturing costs. Further, already existing forming equipment can be utilized.

The present invention is thus suitably applied to the fabrication of complicated ceramic bodies, that are usually formed by extrusion, and to the manufacture of the corresponding fired bodies such as multicellular ceramic honeycomb structures having a high cell density and exhibiting thin cell wall dimensions.

TABLE I

| Batch Components | Composition A | Composition B |
| --- | --- | --- |
| Powder Materials - Inorganics | | |
| Talc | 40.39[a] | 39.95 |
| Calcined Kaolin[b] | 18.32 | 17.32 |
| Kaolin Clay[c] | 15.24 | 16.54 |
| Boehmite[d] | — | 11.04 |
| Alpha Alumina[e] | 4.81 | — |
| $Al_2O_3$[f] | 14.44 | 9.12 |
| Silica[g] | 6.80 | 6.03 |
| Binder System - Organics | | |
| Methyl Cellulose (Binder) | 2.90 | 5.00 |
| Oleic Acid (Surfactant)[h] | — | 0.08 |
| Stearic Acid (Surfactant) | 0.60 | — |
| Polyalpha Olefin (Oil)[i] | 6.00 | 6.50 |

[a]Arctic Mist Talc
[b]Glomax LL Clay
[c]K10 Clay
[d]Dispal 18N4-80 Boehmite
[e]A16 Alumina
[f]Alcan Alumina
[g]Imsil A25 Silica
[h]Tall Oil
[i]Durasyn 162

TABLE II

| | Control A1 | Control A2 | Inventive A1 |
| --- | --- | --- | --- |
| Dimensions | 400/4 | 400/4 | 400/4 |
| Solvent | — | — | Hydrocarbon |
| Extraction Conditions | — | — | Lab - Manual |
| Percent Oil extracted | — | — | 94 |
| Percent Cordierite | 96 | 96 | 96 |
| Percent Mullite | 2.3 | 2.4 | 2.4 |
| Percent Spinel | 0.7 | 0.7 | 0.8 |
| Percent Alumina | 0 | 0 | 0 |
| Percent Porosity | 32.16 | 28.58 | 30.53 |
| Median Pore Size (μm) | 3.20 | 2.96 | 3.07 |
| Bulk Density (g/cm³) | 1.50 | 1.32 | 1.43 |
| Modulus of Rupture (psi) | 314 | 317 | 321 |
| A-axis Strength (psi) | 2003 | 1688 | 1838 |
| B-axis Strength (psi) | 167 | 175 | 112 |
| C-axis Strength (psi) | 15 | 20 | 20 |

TABLE III

| | Control B1 | Control B2 | Inventive B1 | Inventive B2 | Inventive B3 | Inventive B4 | Inventive B5 |
| --- | --- | --- | --- | --- | --- | --- | --- |
| Dimensions | 900/2 | 900/2 | 900/2 | 900/2 | 900/2 | 900/2 | 900/2 |
| Solvent | — | — | HFE-71DE* | HFE-72DE* | Hydro-carbon | HFE-71DE* | Hydro-carbon |
| Extraction Conditions | — | — | Vapor Degr. App | Vapor Degr. App | Vapor Degr. App | Vapor Degr. App | Lab-Manual |
| Percent Oil extracted | — | — | >95 | >95 | 95 | >95 | 97 |
| Percent Cordierite | — | — | — | — | — | — | — |
| Percent Mullite | — | — | — | — | — | — | — |
| Percent Spinel | — | — | — | — | — | — | — |
| Percent Alumina | — | — | — | — | — | — | — |
| Percent Porosity | 25.24 | 22.52 | 23.96 | 25.41 | 24.53 | 23.17 | 21.51 |
| Median Pore Size (μm) | 0.95 | 0.90 | 0.93 | 0.92 | 0.96 | 0.93 | 0.92 |

TABLE III-continued

|  | Control B1 | Control B2 | Inventive B1 | Inventive B2 | Inventive B3 | Inventive B4 | Inventive B5 |
|---|---|---|---|---|---|---|---|
| Bulk Density (g/cm$^3$) | 1.97 | 1.98 | 2.01 | 1.96 | 1.93 | 1.84 | 1.79 |
| Modulus of Rupture (psi) | 237 | — | 213 | 255 | 276 | 280 | — |
| A-axis Strength (psi) | 3519 | — | 4122 | 3959 | 3625 | 3736 | — |
| B-axis Strength (psi) | 369 | — | 612 | 374 | 513 | 515 | — |
| C-axis Strength (psi) | 38 | — | 30 | 39 | 31 | 30 | — |

*A hydrofluoroether-dicholorethylene blend available from 3M, Minneapolis, MI.

It is claimed:

1. In the process of making a ceramic article by forming and shaping into a green ceramic body a moldable plasticized mixture comprising inorganic raw materials, a water-soluble binder, an oil, a surfactant, and water, the improvement which comprises selectively extracting a substantial portion of the oil from the green ceramic body with a solvent capable of dissolving the oil, wherein the remaining components of the mixture are not affected by the solvent.

2. The improved process of claim 1 wherein the extraction of the oil with the solvent is carried out prior to firing.

3. The improved process of claim 2 wherein the extraction of the oil with the solvent comprises:
   (a) washing the green ceramic body with the solvent for a period of time sufficient to remove a substantial portion of the oil therefrom;
   (b) optionally rinsing the green ceramic body with a fresh batch of the solvent; and,
   (c) drying the green ceramic body to remove remaining solvent.

4. The improved process of claim 3 wherein the solvent is selected from the group consisting of hydrocarbons, chlorohydrocarbons, bromohydrocarbons, hydrofluoroether-dichloroethylene blends, hydrochlorofluorocarbons, and combinations thereof.

5. The improved process of claim 4 wherein the hydrocarbons are selected from the group consisting of pentane, cyclopentane, hexane, cyclohexane, heptane, petroleum ether, and octane.

6. The improved process of claim 4 wherein the bromohydrocarbon is n-propyl bromide.

7. The improved process of claim 4 wherein the chiorohydrocarbon is perchioroethylene.

8. The improved process of claim 3 wherein the extraction of the oil with the solvent is carried out in a fully enclosed vapor degreasing apparatus.

9. A method for forming a ceramic article, the method comprising:
   a. forming a moldable plasticized mixture comprising inorganic ceramic powder materials, and an aqueous binder system including a water-based binder, water for the binder, a surfactant, and an oil component;
   b. shaping the plasticized mixture into a green ceramic article;
   c. drying the green ceramic article to form a dried green ceramic article;
   d. applying a solvent to the dried green ceramic article selectively removing a substantial portion of the oil component; and,
   f. firing to develop a fired ceramic article.

10. The method of claim 9 wherein the ceramic article is a cellular monolith.

11. The method of claim 10 wherein the cellular monolith is a honeycomb.

12. The method of claim 11 wherein the solvent is selected from the group consisting of hydrocarbons, chlorohydrocarbons, bromohydrocarbons, hydrofluoroether-dichloroethylene blends, hydrochlorofluorocarbons, and combinations thereof.

13. The method of claim 12 wherein the hydrocarbons are selected from the group consisting of pentane, cyclopentane, hexane, cyclohexane, heptane, petroleum ether, octane.

14. The method of claim 13 wherein the hydrocarbon is cyclohexane.

15. The method of claim 12 wherein the bromohydrocarbon is n-propyl bromide.

16. The method of claim 12 wherein the chlorohydrocarbon is perchioroethylene.

* * * * *